United States Patent [19]

Lackey, Jr. et al.

[11] 4,068,015

[45] Jan. 10, 1978

[54] PROCESS TO MINIMIZE CRACKING OF PYROLYTIC CARBON COATINGS

[75] Inventors: Walter J. Lackey, Jr., Oak Ridge; John D. Sease, Knoxville, both of Tenn.

[73] Assignee: The United States of America as represented by the United States Energy Research and Development Administration, Washington, D.C.

[21] Appl. No.: 738,939

[22] Filed: Nov. 4, 1976

Related U.S. Application Data

[63] Continuation-in-part of Ser. No. 625,228, Oct. 23, 1975, abandoned.

[51] Int. Cl.$^2$ .............................................. G21C 3/06
[52] U.S. Cl. ................................. 427/6; 176/91 SP
[58] Field of Search ........................... 427/6, 213, 214; 176/91 SP

[56] References Cited

U.S. PATENT DOCUMENTS 3,361,638  1/1968  Bokoros ................................. 427/6

Primary Examiner—Ronald H. Smith
Assistant Examiner—S. Silverberg
Attorney, Agent, or Firm—Dean E. Carlson; Stephen D. Hamel; John B. Hardaway

[57] ABSTRACT

Carbon-coated microspheroids useful as fuels in nuclear reactors are produced with a low percentage of cracked coatings and are imparted increased strength and mechanical stability characteristics by annealing immediately after the carbon coating processes.

4 Claims, 1 Drawing Figure

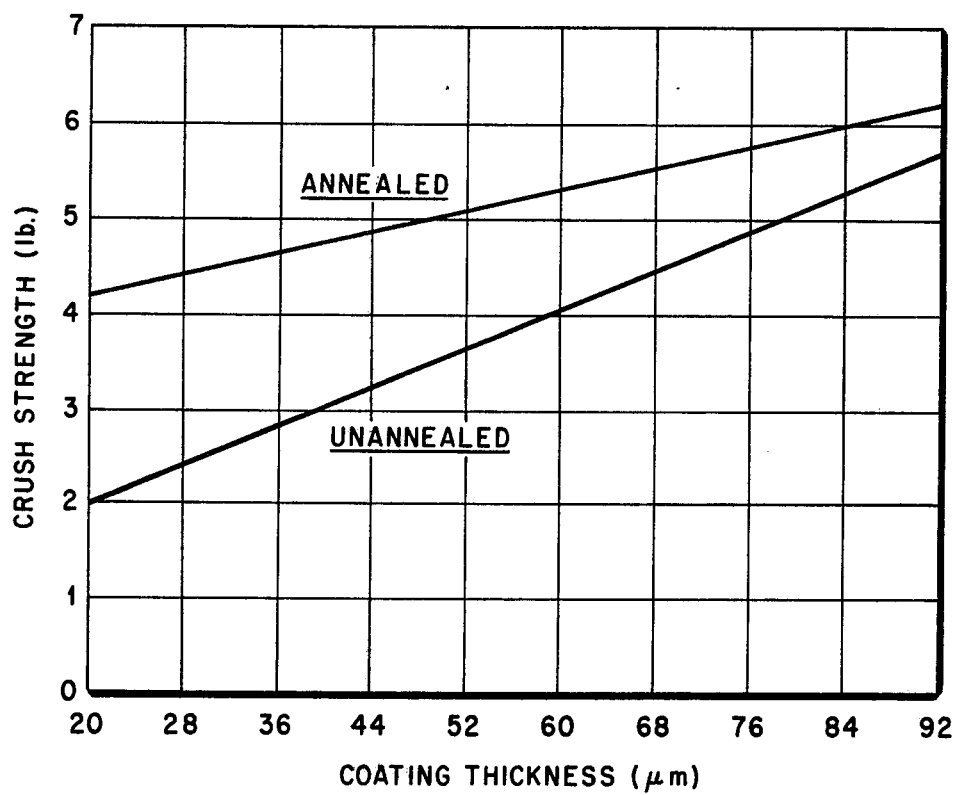

PROCESS TO MINIMIZE CRACKING OF PYROLYTIC CARBON COATINGS

CROSS-REFERENCE TO RELATED APPLICATION

This application is a continuation-in-part of U.S. Application Ser. No. 625,228, filed Oct. 23, 1975 now abandoned.

BACKGROUND OF THE INVENTION

This invention was made in the course of, or under, a contract with the Energy Research and Development Administration. It relates generally to a process for improving the mechanical properties of gas cooled reactor fuels.

Fuels for high temperature gas cooled reactors have generally been composed of spherical particles of fissile uranium or plutonium as an oxide for carbide in the form of an approximately spherical kernel. The kernal may also be formed of a solid solution such as $(UPu)C_2$ or $(UPu)O_2$. This kernel sometimes is additionally composed of a fertile material such as thorium-232 or uranium 238, which is in the same chemical form as the fissile material. Alternatively the fertile material can be in a separate particle from the fissile material. The fertile and fissile fuel kernels are also provided with several layers of protective coatings to contain fission products and to protect the fuel kernels. The kernel, along with the coatings, constitutes a fuel particle. Normally, these coatings will comprise a buffer layer of porous carbon within a layer of dense pyrolytic carbon, followed by a layer of silicon carbide, and a final layer of dense pyrolytic carbon. For kernels containing only fertile material it is common to use a two layer coating, the so called Biso design, consisting of a buffer and dense carbon layer. The inner or buffer layer of porous carbon with about 30 to 70 percent porosity absorbs any expansion or swelling of the kernel during irradiation and minimizes damage to the other layers due to fission fragment recoil from the kernel. The adjacent dense carbon layer is applied to isolate the kernel from attack by deleterious gases such as chlorine formed in depositing the silicon carbide layer. The silicon carbide layer gives a dimensional stability to the overall fuel particle and provides containment for metallic fission fragments. The final dense pyrolytic carbon layer protects the silicon carbide plus provides a rough surface to permit fuel rod fabrication. The combination of all of the layers serves the function of operating as a pressure vessel for containment of fission product gases. Fuel particles are normally approximately spherical or spheroidal with a diameter of about 400 to 1200 micrometers. The central fuel kernel is generally about 200 to 1000 micrometers in diameter. The layer of porous carbon is generally about 25 to 100 microns in thickness. The inner and outer layers of dense carbon and the silicon carbide layers are each typically 20 to 50 micrometers thick. In the case of two layer designs the buffer and dense carbon layers are each typically 50 to 120 micrometers thick.

The various layers of coating are applied to the fuel kernel by techniques which are well known in the prior art. Generally these layers are applied while the kernels are suspended within a fluidized bed such as that described in U.S. Pat. No. 3,889,631. The highly porous buffer carbon layer is deposited by the thermal decomposition of acetylene as is disclosed, for example, in U.S. Pat. No. 3,472,677. This decomposition occurs while the particles are suspended within a gaseous medium. The acetylene is mixed with the suspending gas which is generally an inert gas such as argon. The silicon carbide layer is similarly deposited within the same fluidized bed by the thermal decomposition of methyl trichlorosilane. Dense carbon layers are generally applied by the method described in U.S. Pat. No. 3,471,314 from the thermal decomposition of propylene but mixtures of propylene and acetylene, methane, and other hydrocarbons have been used. These various coating operations are generally carried out within the following temperature ranges:

Buffer carbon coating 1000° to 1500° C
Silicon carbide coating 1400° to 1700° C
Dense isotropic carbon coating 1200° to 1500° C.

While all of these prior art processes produce a product which is satisfactory for use in a gas cooled reactor, the processes themselves tend to produce a high percentage of defective particles. Since there is no effective process for culling defective particles, the released fission products complicate maintenance of contaminated reactor components. Cracks appearing in the second coating layer, i.e. the pyrolytic carbon, are the primary cause of defective particles. In the case of the fissile particles the crack lets chlorine generated during silicon carbide coating reach the kernel while for the two layer coating design a crack results in escape of an appreciable fraction of the fission products. In addition to the high percentage of cracked particles the structurally intact particles which emerge from the coating operation have coating layers with high stress levels. Prior art attempts at solving these problems have been only partially successful. Such attempts have included a subsequent annealing step. This subsequent annealing step has somewhat reduced the problem of high stress levels within the coating layers. However, this step does nothing to reduce the percentage of cracked particles.

SUMMARY OF THE INVENTION

It is thus an object of this invention to provide a process which significantly improves upon the prior art techniques of producing fuel microspheres.

It is a further object of this invention to provide a process of producing carbon coated nuclear fuel particles which have a very small percentage of cracked particles.

It is a still further object of this invention to provide a process of producing carbon coated fuel particles which have greatly reduced stress levels within the coating layers.

These, as well as other objects, are accomplished by annealing the coated particles immediately after deposition of the dense pyrolytic carbon layer.

BRIEF DESCRIPTION OF THE DRAWING

The single FIGURE of drawing illustrates in graphic form the crush strengths of fuel particles produced by prior art processes as compared to that of particles produced by the process of this invention.

DETAILED DESCRIPTION

According to this invention, it has been found that coated fuel particles crack because of the interaction of two distinct sources of stress within the dense pyrolytic carbon layers. The first source of stress is the stress created during the deposition of the coating. This stress is referred to as a deposition stress. The second source of stress is the thermal stress created by cooling the particles from the deposition temperature to room temperature. This second stress, or thermal stress, is created basically because of differences in thermal expansion between the various coating layers. The largest thermal expansion mismatch exists between the buffer layer and the adjacent dense carbon layer. By this invention it has been found that the deposition stresses in the dense carbon layer may be relieved by heating the particles immediately after the deposition process to an annealing temperature for a sufficient length of time. It is critical to the process of this invention that the annealing step be performed prior to cooling which results in any significant thermal stresses. By carrying out the annealing step prior to a cooling step the deposition stresses are relieved prior to the creation of any thermal stresses. Thus, by the process of this invention, the sum total of the stresses acting on the dense coating layer or layers of a fuel particle is greatly reduced. By reducing the stresses acting on the coating layers, the process of this invention greatly reduces the fraction of fuel particles having cracked carbon coatings.

It has been found that a temperature within the range of about 1600° to 2000° C is sufficiently high to relieve the stresses created during the deposition of the dense carbon layer. The length of time during which the annealing step is carried out is not critical but is dependent upon temperature, with higher temperatures requiring less time. At 1600° C at least 60 minutes is needed to anneal the particles according to our invention. At 2000° C, as little as 1 minute is sufficient. It is preferred, however, to anneal the particles for about 30 minutes at 1800° C prior to cool-down. By relieving the deposition stresses prior to cooling the fuel particles and the creation of thermal stresses, the cracking force created by the combination of the two stresses is eliminated. Thermal stresses created during the cool-down by the thermal expansion mismatches still act upon the particles after the relief of the deposition stresses. The particles, however, have sufficient mechanical strength to withstand the thermally created stresses.

The annealing step of this invention may be carried out for longer times without detrimental results so long as the dense pyrolytic carbon coatings are not graphitized. According to U.S. Pat. No. 3,361,638, annealing at 2000° C for at least about 8 hours is needed to graphitize a pyrolytic carbon coating. Should the coatings graphitize, they would shrink excessively during subsequent fast neutron irradiation and fail. Accordingly, the annealing step of our invention is carried at, for a time at least, 1–60 minutes (depending upon the temperature) yet insufficient to graphitize the pyrolytic carbon coating.

Not only is the percentage of cracked particles greatly reduced by the process of this invention, but a great and unexpected advantage of the process is that the strength of the resulting particles is greater than that of the particles produced by the prior art process. The process of this invention thus reduces the percentage of cracked particles by a factor of about 20 to 100 as well as increases the mechanical stability and strength of the resulting particles. Crush strength for Biso coated particles is increased about 110% for particles having thin outer coatings and by about 10% for particles having thick outer coatings.

While the improvement over the prior art processes represented by the invention disclosed herein is described in terms of an annealing step carried out without a cool-down and immediately after pyrolytic carbon deposition, it is readily apparent that the improvement may be realized with a slight cool-down or by waiting a period of time after deposition such that the combination of deposition stresses and thermal stresses is not great enough to crack the particles. As a practical matter, however, and as the preferred embodiment of this invention, the fuel particles are annealed immediately after the deposition process. In-place annealing could be performed after deposition of the second coating layer and/or after deposition of the final coating layer; both the second and fourth layers being dense pyrocarbon.

Having generally set forth the improvement represented by the process of this invention the following specific examples are given as further illustration and aid to the understanding thereof.

EXAMPLE I

Three series of experiments were conducted to study processing steps which reduce the fraction of defective fuel particles. These experiments were conducted in a fluidized coating furnace similar to the one described in U.S. Pat. No. 3,889,631. In the first series, a charge of 1.5 Kg of buffer carbon coated thoria particles having a size of 560 micrometers were coated at a temperature of 1225° C using propylene gas at a flow rate of 3.6 cubic feet per minute. These particles were coated for 17.4 minutes to produce a coating thickness of 50 micrometers. Three such coating runs were made. A portion of the particles in each coating run was examined following coating to determine the fraction of cracked particles. A fourth coating run was made using the same procedure with the exception that the particles were annealed at 1800° C for 30 minutes subsequent to coating and prior to any cooling. The particles produced by the fourth run were analyzed for the fraction of cracked particles.

In a second series, the charge of buffer coated particles was increased to 2.5 Kg and coating was carried out at 1375° C using propylene gas at a flow rate of 3.6 cubic feet per minute. The coating time was 29 minutes and the coating thickness was 102 micrometers. The fraction of particles having cracked coatings was determined prior to any annealing and after an anneal of 1800° C for thirty minutes subsequent to cooling of the particles from the coating temperature. A second such coating run was made but the particles were annealed at 1800° C for 30 minutes prior to cooling and subsequent to the coating step.

The third series of experiments was substantially like the first series except that a temperature of 1375° C was utilized. The higher temperature resulted in a coating thickness of 95 micrometers. Analyses were performed as discussed above with regard to the second series. All annealing steps were conducted while the particles were in a fluidized state.

The results of the analyses of the three series are given in the Table below. These data show a substantial improvement in the quality of the product when an annealing step is performed within the coating furnace prior to any cooling of the particles.

TABLE

Reduction in Number of Cracked Coatings by Employing In-Place Annealing
Fraction of Particles With Cracked Coatings

| Series Number | Not Annealed | | | Annealed After Previously cooling | | | In-Place Annealed |
| --- | --- | --- | --- | --- | --- | --- | --- |
| | Trial 1 | Trial 2 | Trial 3 | Trial 1 | Trial 2 | Trial 3 | |
| 1 | $9 \times 10^{-2}$ | $3 \times 10^{-2}$ | $6 \times 10^{-2}$ | | | | $6 \times 10^{-4}$ |
| 2 | $2 \times 10^{-3}$ | | | $2 \times 10^{-3}$ | | | $1 \times 10^{-4}$ |
| 3 | $8 \times 10^{-5}$ | $5 \times 10^{-4}$ | $2 \times 10^{-5}$ | $1 \times 10^{-4}$ | $2 \times 10^{-4}$ | | $9 \times 10^{-6}$ |

As can be noted from the above table the average improvement factor was 100 for the particles of the first series, 20 for those in the second series and 22 for those of the third series. It must be further observed that an annealing step after cooling the coated particles provided no beneficial results. Thus, the annealing step of this invention carried out prior to cooling to room temperature reduces the fraction of defective particles.

EXAMPLE II

Biso coated thoria particles having a variety of coating thicknesses were produced by the process as described in Example I. About sixty coating runs were made, with half of the runs utilizing an annealing step immediately after coating and prior to any cooling. The other half of the runs had no annealing after the coating step. Coating thickness was varied by varying the length of time for coating.

About fifty particles were produced in each run. The average crush strength for each run was determined by placing the particles between steel plates and slowly applying force. The results of this test are illustrated in the single FIGURE of drawing. It is thus seen from the FIGURE of drawing that the annealed particles produced in accordance with this invention have greatly improved crush strengths as compared to unannealed particles.

The process of this invention thus overcomes significant problems which existed in the prior art. By this invention the fraction of defective particles produced in a coating process is greatly reduced and the remaining structurally intact particles have significantly improved crush strengths. It will be apparent to those skilled in the art that slight variations may be made in the disclosed process without departing in the spirit and scope of the appended claims. Such variations may include a slight cooling after deposition and prior to annealing so long as there is no significant creation of thermal stresses. The annealing step of this invention may be subsequently carried out to relieve the deposition stresses and reduce the fraction of defective particles.

What is claimed is:

1. In a process for producing nuclear fuel comprising microspheroidal particles of a fissile or fertile nuclear material coated with a carbon buffer layer and a dense pyrolytic carbon layer, said process comprising the steps of coating said microspheroidal particles with said buffer layer and said pyrolytic carbon layer; the improvement comprising the step of annealing at a temperature within the range of 1600°–2000° C. for a time at least 1–60 minutes yet insufficient to graphitize said pyrolytic carbon layer, said annealing step being carried out immediately after coating said dense pyrolytic carbon layer without cooling prior to said step of annealing.

2. The improvement according to claim 1 wherein said annealing step is carried out while said particles are suspended within an argon atmosphere.

3. The improvement according to claim 2 wherein said step of annealing is carried out at a temperature of about 1800° C.

4. The improvement according to claim 3 wherein said step of annealing is carried out for about 30 minutes.

* * * * *